(No Model.)

H. H. TAYLOR.
TRAY FOR DRYING FRUIT.

No. 486,137. Patented Nov. 15, 1892.

Witnesses:
R. S. Ober
W. S. Duvall

Inventor
Horace H. Taylor
By his Attorneys,
C. A. Snow & Co.

UNITED STATES PATENT OFFICE.

HORACE H. TAYLOR, OF FRESNO, CALIFORNIA, ASSIGNOR OF ONE-HALF TO WILLIAM M. STORY, OF SAME PLACE.

TRAY FOR DRYING FRUIT.

SPECIFICATION forming part of Letters Patent No. 486,137, dated November 15, 1892.

Application filed April 29, 1891. Serial No. 390,913. (No model.)

*To all whom it may concern:*

Be it known that I, HORACE H. TAYLOR, a citizen of the United States, residing at Fresno, in the county of Fresno and State of California, have invented a new and useful Tray for Drying Fruit, of which the following is a specification.

This invention relates to improvements in evaporating-pans, and is especially adapted for drying grapes and other fruits containing considerable moisture.

The objects of my invention are to provide a pan of cheap and simple construction that will not warp under the sun's rays or be affected by the moisture; which is light, durable, readily handled, and piled or stacked; which will permit of a thorough ventilation and circulation of air to all parts of the fruit contained therein, and which will readily drain all moisture given off by the fruit during the process of evaporation.

Other objects and advantages of the invention will appear in the following description, and the novel features thereof will be particularly pointed out in the claim.

Figure 1:
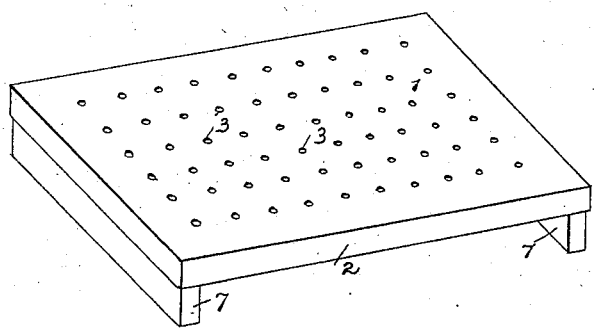
Figure 2:
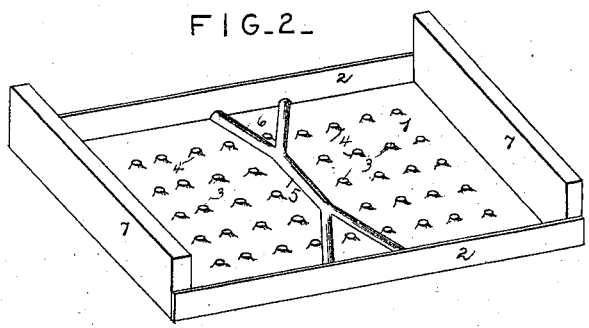
Figure 3:
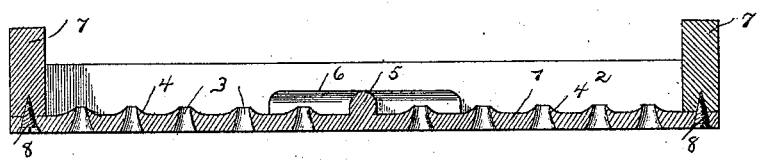
Figure 4:
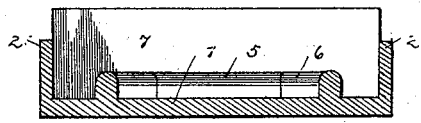

Referring to the drawings, Figure 1 is a perspective of a pan constructed in accordance with my invention. Fig. 2 is a similar view of the pan inverted. Fig. 3 is a vertical longitudinal section, the same being shown enlarged. Fig. 4 is a transverse section.

Like numerals of reference indicate like parts in all the figures of the drawings.

In practice I construct the bottom of the pan, together with its opposite longitudinal sides, of paper-pulp or other similar substance, though, as will hereinafter appear, these portions of the pan may be constructed of other substances or materials.

1 designates the rectangular bottom of the pan, the opposite side edges of which are downturned to form longitudinal sides 2, integral with the bottom. In constructing the bottom the same is provided with a series of perforations 3, extending throughout its area, said perforations being of truncated-cone shape, and the stock or material punched through and from the upper side of the bottom to form the perforations is left intact and constitutes depending surrounding flanges 4. In order to stiffen the bottom and provide for a free circulation of air to the contents of the pan, the perforations 3, with their surrounding flanges, are formed, and the rigidity provided by them is increased by means of a central transverse rib 5, extending about one-third the distance across the bottom of the pan, and from the ends of which diverge opposite pairs of diagonal ribs 6, which join with the downwardly-turned sides 2 of the pan. The ribs 5 and 6 are formed integral with the pan, as shown.

7 designates a pair of end bars, of such length as will adapt them to be interposed between the sides 2 of the pan. These end bars are thicker and deeper than are the sides, and in addition to being end bars constitute supports for the pan when the same is upon the ground, table, or other place, and by their depth elevate the bottom of the pan and the lower edges of the sides 2 above the ground, and thus provide for the free admission of air under and across the bottom. The end bars are secured in position by the series of nails 8, driven through the bottom and the ends of the sides 2. The pan thus constructed is now coated with a suitable waterproof liquid and is completed and ready for use.

In operation the pan is stood upon the ground or other support in the open air and the fruit laid thereon for the purpose of evaporating. Although the pan is well adapted for use in connection with the evaporation of various fruits or vegetables, it, as before stated, is more especially designed for that class containing considerable liquid or moisture, such as grapes. The moisture thrown off by the fruit is readily conducted to an adjacent perforation 3, and by the conical shape given the same readily passes from there to the ground. The material from which the pan is formed insures lightness and durability, the coating given the same excludes all moisture and closes the pores of the material, rendering the same readily cleaned, while the ribs 5 and 6 and the numerous circular flanges 4 surrounding each perforation insure great stability and rigidity, thus preventing any warping from the rays of the sun.

Having described my invention, what I claim is—

The herein-described evaporating-pan, consisting of a bottom, opposite integrally-formed side walls depending from the longitudinal edges of the bottom, said bottom and side walls being formed of paper or wood pulp, the bottom having a series of perforations punched from its upper side through the same, the stock surrounding the openings, forming inclosing flanges, strengthening-ribs integrally formed upon the under side of the bottom, and end pieces between the sides and secured to the bottom and sides, substantially as specified.

In testimony that I claim the foregoing as my own I have hereto affixed my signature in presence of two witnesses.

HORACE H. TAYLOR.

Witnesses:
W. N. ROHRER,
N. W. MOORE.